United States Patent [19]
Egger

[11] Patent Number: 5,785,169
[45] Date of Patent: Jul. 28, 1998

[54] CONVEYOR ASSEMBLY OF THE CONVEYING OF OPEN CONTAINERS

[75] Inventor: Walter C. Egger, CH-Weggis, Switzerland

[73] Assignee: VT Zurich Marketing Pte. Ltd., Balester Hill Center, Singapore

[21] Appl. No.: 786,641

[22] Filed: Jan. 21, 1997

[30] Foreign Application Priority Data

Oct. 18, 1996 [CH] Switzerland .................. 2549/96

[51] Int. Cl.$^6$ .................................................. B65G 47/22
[52] U.S. Cl. ............................ 198/493; 198/626.1
[58] Field of Search ........................... 198/438, 493, 198/604, 606, 626.1

[56] References Cited

U.S. PATENT DOCUMENTS

| | | | |
|---|---|---|---|
| 3,074,533 | 1/1963 | Ninneman et al. | 198/626.1 X |
| 3,108,682 | 10/1963 | Zipper | 198/626.1 |
| 4,290,519 | 9/1981 | Harvey | 198/626.1 X |
| 4,934,510 | 6/1990 | Lutgendorf | 198/626.1 X |
| 5,318,165 | 6/1994 | Spatafora | 198/493 X |
| 5,318,166 | 6/1994 | Mojden et al. | 198/493 |

*Primary Examiner*—James R. Bidwell
*Attorney, Agent, or Firm*—Tarolli, Sundheim, Covell, Tummino & Szabo

[57] ABSTRACT

The invention provides a conveyor assembly for the conveying of containers which are open at one end thereof, particularly for the conveying of bottles made of plastic material. The conveyor assembly comprises a main conveyor which is adapted to continuously convey a row of containers located within the conveyor assembly in a certain distance from each. The conveyor assembly comprises a first handing over set-up assembly located at the input side of the conveyor and a second handing over et-up assembly located at the output side of the conveyor.

10 Claims, 2 Drawing Sheets

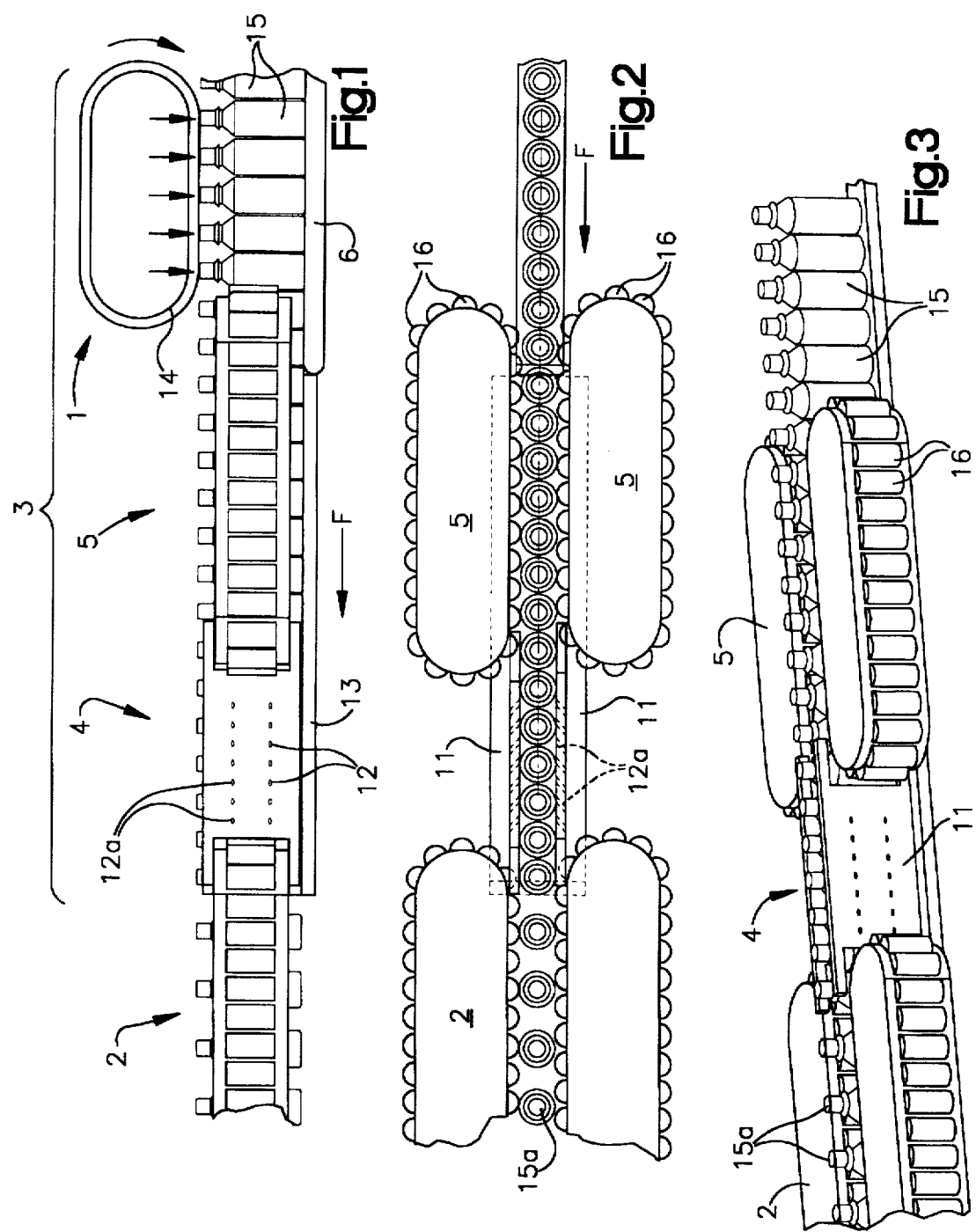

& # 1
CONVEYOR ASSEMBLY OF THE CONVEYING OF OPEN CONTAINERS

FIELD OF THE INVENTION

The present invention refers to a conveyor assembly for the conveying of containers which are open at one end thereof, particularly for the conveying of bottles made of plastic material. Such a conveyor assembly comprises a main conveyor which is adapted to continuously convey a row of containers located within the conveyor assembly in a certain distance from each other. The conveyor assembly according to the invention includes a first handing over set-up assembly located at the input side of the conveyor assembly, and a second handing over set-up assembly located at the output side of the conveyor assembly.

The first and second handing over set-up assemblies are adapted, respectively, for handing over the containers from an input conveyor apparatus to a main conveyor apparatus and from the main conveyor apparatus to an output conveyor apparatus.

PRIOR ART

Conveyor assemblies for the conveying of containers which are open at one end thereof, for instance bottles made of plastic materials, are well known in the art in a number of different designs. For simplicity's sake, in the following, reference is made to bottles only instead of to containers which are open at one end thereof.

The task to be fulfilled by such a conveyor assembly may be seen, for instance, in the fact, that the bottles have to be displaced from an initial location, e.g. an intermediate or input storage location, to a processing station e.g. a bottling station. Particularly, the bottles have to be handed over to such a bottling station in a predetermined orientation. Between the initial location and the bottling station, the bottles usually are subjected to a cleaning operation, for instance by moving the bottles along a bottle cleaning apparatus. Such a bottle cleaning apparatus is well known to any person skilled in the art and is usually designated by the expression "Bottle Rinser".

Moreover the fact must be considered, that the bottles have to be conveyed between the input location and the bottling station over several levels by means of vertically operated conveying apparatuses.

It is a fact that light recyclable plastic bottles, for instance PET-bottles, are used more and more in recent times and that such light PET-bottles present new problems to known conveying assemblies. The main problem may be seen in the fact that such PET-bottles have a very low inherent stability and, moreover, at least as long as they are empty, they show an insufficient stability and steadiness.

As a main conveying assembly, usually drag chain conveyors are used. These conveyors are provided with two conveyor chains located in a certain lateral distance from each other and driven to a uniform motion. The two conveyor chains are provided with driver elements which are directed against each other, which delimit a conveying channel and which are equipped with elastic gripping means. As first handing over set-up means located at the input side, usually belt conveyors are used on which the bottles are conveyed in an upright manner. In order to guide the bottles laterally, the belt conveyors are normally provided with guide railings.

In such a conveyor assembly, the conveying path comprises in the aforementioned application not only straight paths, but also paths which are curved in vertical direction. When the bottles travel along this vertically curved section, the longitudinal access of subsequent bottles maintain a certain mutual distance. In the case of a drag chain conveyor, this distance is not always regular. In order to provide for a distance between the bottles which is at least more or less regular, it is common practice to convey the bottles in the first handing over set-up assembly located at the input side of the conveyor assembly such that they are located contacting each other. Thereby, the conveying speed of the main conveyor, as compared with the conveying speed of the first handing over set-up assembly is increased such that the required distance between the bottles results. In the second handing over set-up assembly located at the output side of the conveyor, it is permissible that the bottles are located close to each other with a decreased conveying speed of said conveyor.

Because of such drag chain conveyor or a similarly opening main conveyor engages the bottles to be conveyed only laterally, the position which is taken by the bottles in the conveying region of the main conveyor and in which position the bottles leave this main conveyor is only determined by the position in which the bottles are handed over from the mentioned handing over set-up assembly located at the input side of the main conveyor to the main conveyor.

As already mentioned, the bottles conveyed by the belt conveyor by which they are handed over to the first handing over set-up assembly are in upright position. In the handing-over region to the subsequent main conveyor, a scattering of the bottles takes places due to the higher operating speed of the main conveyor. In other words, a bottle grasped by the main conveyor is separated from the subsequent bottle. Due to this separation, the now front-most bottle looses its stability within the formation of he bottles which are located closely to each other on the conveyor belt. The result is that a swaying bottle is not held in its position by the closely located adjacent bottles.

However, it is very important that the bottles maintain their upright position in this handing-over phase until they are kept by the main conveyor. The reason is, that the bottles leave the main conveyor in the same spatial orientation and are transformed to the second handing over set-up assembly located at the output side of the main conveyor in upright position.

Because particularly PET-bottles have a low steadiness, it has been proposed in the European Patent Publication 0 645 323 to provide auxiliary means in the transition regions from the first handing over set-up assembly located at the input side of the main conveyor to the main conveyor and in the transition regions from the main conveyor to the second handing over set-up assembly located at the output side of the main conveyor which definitely set the spatial orientation of the hollow containers to be conveyed. Thereby, it is said that also hollow containers having a low steadiness can be conveyed reliably and further can be handed over from the first handing over set-up assembly located at the input side of the main conveyor to the main conveyor and from the main conveyor to the second handing over set-up assembly located at the output side of the main conveyor, without the need that expensive format means have to be provided.

Even if such auxiliary means have proven to be reliable, in the meantime a further problem has shown. Particularly, a high percentage, up to 5%, of the bottles arriving at the main conveyor are boiled or bulged or otherwise deformed an/or that the supplied bottles shown an insufficient dimensional stability. In both cases, these problems lead to the fact that the bottles are difficult to handle and cannot be handed over from one conveyor to another one. For example, practice has shown that the handed-over bottles can be deformed up to one third of there diameter. Such deformed bottles can, depending of their orientation or of the position of the bulging with reference to the grasping members, change their position during their conveying, with the result that serious problems can occur during handing over a bottle from on to a subsequent conveyor.

OBJECTS TO THE INVENTION

It is an object of the invention to provide a conveyor assembly for the conveying of containers which are open at one end thereof, particularly for the conveying of bottles made of plastic material, by means of which also bottles which are handed over in a deformed state or which are not exactly true to size can be reliably aligned and conveyed within the conveyor assembly.

SUMMARY OF THE INVENTION

In order to meet this and other objects, the invention provides a conveyor assembly for the conveying of containers which are open at one end thereof, particularly for the conveying of bottles made of plastic material. The conveyor assembly comprises a main conveyor. This main conveyor is adapted to continuously convey a row of containers located within said conveyor assembly in a certain distance from each other.

Moreover, the conveyor assembly comprises a first handing over set-up means located at the input side of the conveyor means and a second handing over set-up means located at the output side of the conveyor means.

The first and second handing over set-up means are adapted, respectively, for handing over said containers from an input conveyor apparatus to a main conveyor apparatus and from the main conveyor apparatus to an output conveyor apparatus.

The first handing over set-up means located at the input side of the conveyor means comprises a first airlock means in which the containers are aligned by means of the influence of an air stream for being handed over in said subsequent main conveyor.

The second handing over set-up means located at the output side of the conveyor means comprises a second airlock means in which the containers are aligned by means of the influence of an air stream for being handed over in the subsequent conveyor means.

The first handing over set-up means located at the input side of the conveyor means comprises pneumatically operated means for subjecting said containers to overpressure.

Due to the fact that the conveyor assembly is provided with an airlock means in which the hollow containers are aligned to be handed over in the subsequent conveyor by means of moved air, the bottles can be brought in the desired position in a touchless manner and without the need of any mechanical means. Thereby, in contrary to most conveyor assemblies known in the art, it does not matter whether or not the bottles are deformed or true to size. Particularly, it does not matter whether or not the frontmost bottle is separated from the subsequent bottle in the transition region from the main conveyor to the subsequent conveyor because the immediately following bottle is kept in upright position by means of the air stream.

Due to the fact that an airlock module can also be provided in the second handing over set-up assembly located at the output side of the main conveyor, it can be realized that the bottles are also properly aligned in this region. The result is that the bottles can be handed over to the subsequent conveyor in a well defined spatial orientation. Also in this case, it does not matter whether or not the bottles are bulged or boiled or are not true to size.

Due to the provision of pneumatically operated means, located in the region of the first handing over set-up assembly located at the input side of the main conveyor, the hollow containers can be subjected to overpressure. The result is that almost any deformed hollow container can be put in a normal condition because probably present bulges are removed. It is understood that the foregoing discussed characteristics can be combined as required within the limit of the scope of protection of the appended claims.

BRIEF DESCRIPTION OF THE DRAWINGS

In the following, an embodiment of the invention will be further described, with reference to the accompanying drawings, in which:

FIG. 1 shows a schematic side view of the handing over set-up located at the input side of the conveyor apparatus;

FIG. 2 shows a schematic top view of the apparatus shown in FIG. 1;

FIG. 3 shows a perspective side view of the handing over set-up located at the input side of the conveyor apparatus;

DETAILED DESCRIPTION OF A PREFERRED EMBODIMENT

Figure 4:
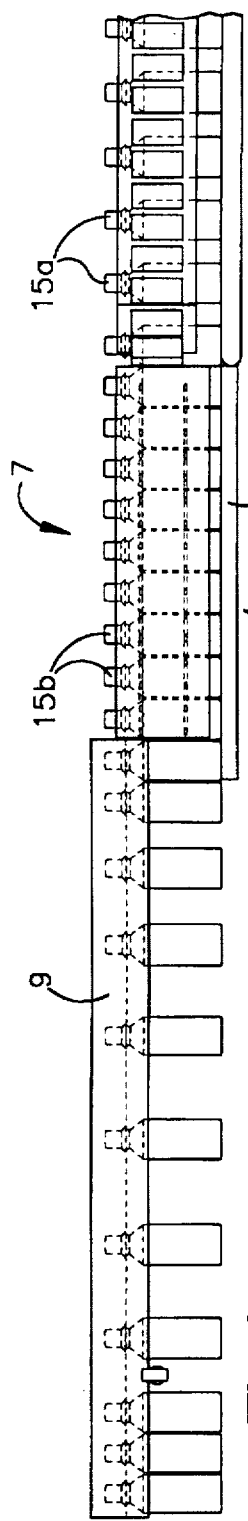
FIG. 4 shows a schematic side view of the handing over set-up located at the output side of the conveyor apparatus.

As the basic principle of such a conveyor apparatus for the conveying of hollow containers which are open at the one end is generally known to any person skilled in the art, the following description is limited to the details and features of the components of the conveyor apparatus which are essential in connection with the present invention. Moreover, even if the apparatus according to the invention is suited for a wide variety of containers, for the sake of simplicity, in the following, reference is made to bottles only.

In FIGS. 1–3, there are schematically shown three different views of the handing over set-up located at the input side of the conveyor apparatus, as explained above. Basically, the handing over set-up comprises a pneumatically operated blow-up assembly 1, an intermediate conveyor assembly 5 which is designed as a side-band conveyor as well as an airlock module 4. The main conveyor is shown only partially and has the reference number 2. The bottles to be conveyed are designated by reference numeral 15. The supply of the bottles 15 at the input end is accomplished by means of a conveyor belt assembly 6.

The bottles 15 arriving on the conveyor belt 6 are subject to overpressure by means of a pneumatically operated blowing apparatus. Thereby, bulges or dents or boils are corrected to the most part. The arriving bottles are grasped positively by means of the side-band conveyor. The side-band conveyor 5 comprises traveling driver means 16 which engage the bottles 15 by adhesion.

The pneumatically operated blow-up assembly 1 comprises a belt 14 that is electronically synchronized with the traveling speed of the bottles 15. The pressurized air is adjusted by means of apertures provided in the belt 14. In order to compensate for eventually occurring differences of the size of the bottles 15, the belt 14 traveling along an endless loop preferably is resiliently supported and/or designed to be compressible.

Instead of a belt 14 traveling along an endless loop, other means can be provided. For instance, resilient tubes could take the place of the belt 14 which are provided with a catch plate located at the output end. The catch plate travels mechanically coupled along a certain distance with the bottle necks; in this way, the catch plate is synchronized with an opening of the bottles. Another possibility for ensuring a synchronized traveling of the bottles is to provide electronically controlled means.

At the output end of the side band conveyor 5, the airlock module is located in which the bottles 15 are oriented and arranged in a row by means of a pneumatically reverse flow of air. For this purpose, the airlock module 4 comprises two lateral walls 11. The interiors of these lateral walls 11 are provided with a plurality of particular nozzles 12, 12a. In order to provide for the effect that the bottles 15 are subjected to the influence of the pneumatical blow, each of the two lateral walls 11 is provided which two rows of nozzles 12, 12a which are located offset to each other in vertical direction. The output angle of the nozzles 12, 12a can be selected according to the particular requirements.

In order to support the bottles 15 within the airlock module 4, the latter one comprises a bottom plate member 13. Due to the fact that the bottles 15 are laterally not engaged within the airlock module 4 by any auxiliary mechanical means, it is ensured that the bottles 15 are aligned on the bottom plate 13 as far as their height is concerned. The required pneumatical supply lead members are not shown in the drawings for simplicity's sake.

In the following conveyor apparatus 2, the bottles 15, which are located directly adjacent to each other in the airlock module 4, are re-arranged such that the particular bottles 15 have a certain distance between each other. This is accomplished by the fact that the speed of the main conveyor 2 is adjusted higher than the speed of the side band conveyor 5.

The advantage of providing such an airlock module instead of mechanical means particularly may be seen in the fact that also bottles having bulges or dents or boils or bottles which don't have a regular size can be reliably adjusted in the conveyor. A further advantage may be seen in the fact that an airlock module 4 according to the invention functions reliably and dependably, independently of the shape of the bottles, because no format means are required which are specific to the bottles to be handled. Thus, even bottles having different sizes and shapes can be fed into the airlock module 4 in a safe manner and handled thereby without problems.

Figure 5:
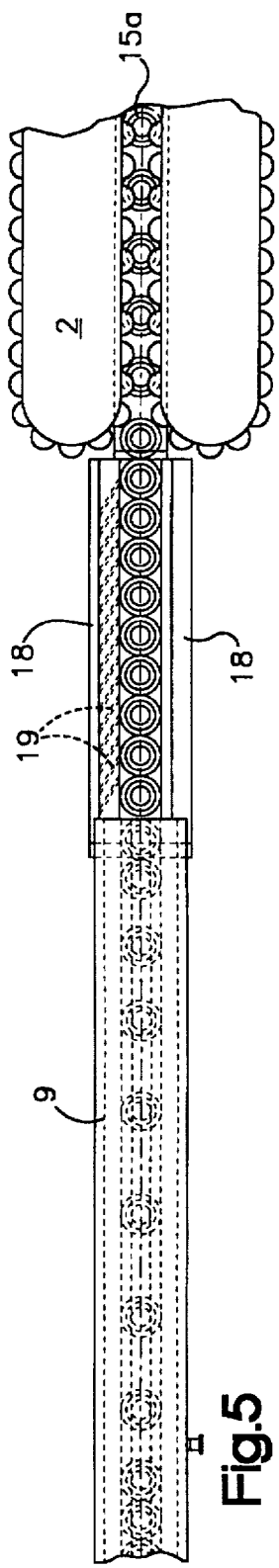
FIG. 5 shows a schematic top view of the apparatus shown in FIG. 4.
Figure 6:
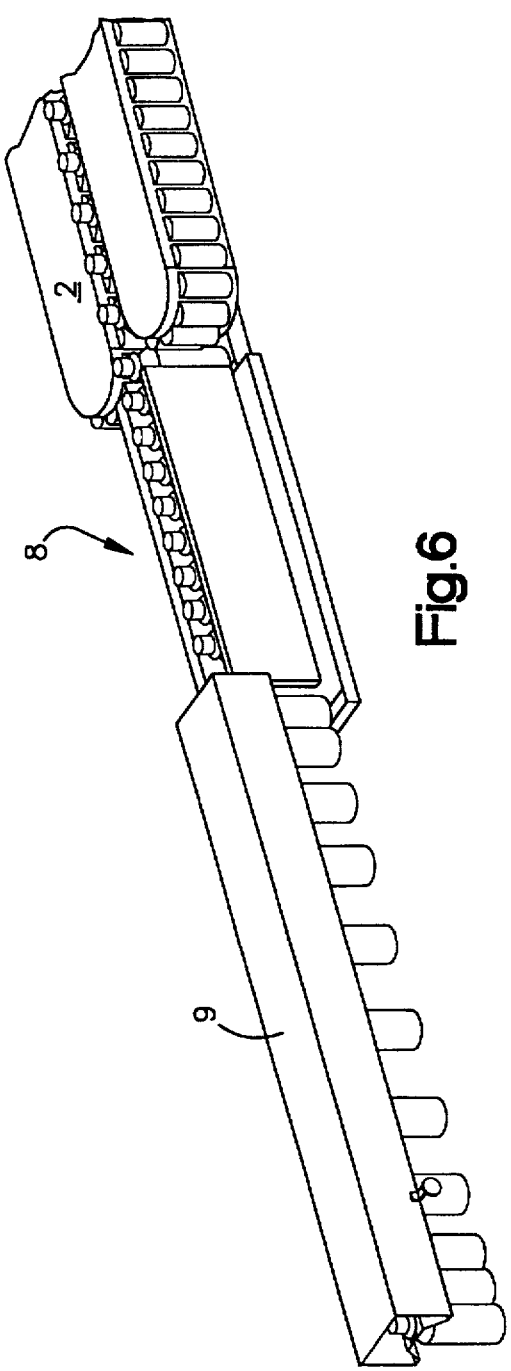
FIG. 6 shows a perspective side view of the handing over set-up located at the output side of the conveyor apparatus.

FIG. 4 shows a schematic side view of the handing over set-up 7 located at the output side of the conveyor apparatus, FIG. 5 shows a schematic top view of the apparatus shown in FIG. 4, and FIG. 6 shows a perspective side view of the handing over set-up 7 located at the output side of the conveyor apparatus.

The handing over set-up 7 located at the output side of the conveyor apparatus comprises, according to the embodiment shown in the drawings, essentially an airlock module 8 located behind the main conveyor apparatus 2.

Again the airlock module 8 is provided with two lateral wall members 18 and with a bottom member 20. However, in the case of the handing over set-up 7 located at the output side of the conveyor apparatus, only one of the side walls members 18 is provided with air exit nozzles 19. The airlock modules 8 serves for aligning and setting-up of the bottles 15a which have been arranged in the main conveyor apparatus 2 such that they have a certain distance between each other. The result is, that the bottles 15a can be handed over to the subsequent conveyor apparatus 9 without any problems.

The aforementioned subsequent conveyor apparatus 9 is designed as a pneumatically operated conveyor which supports the bottles 15b in the region of their bottle necks and conveys these bottles pneumatically in a manner which is well known to any person skilled in the art. Normally, at the end of this subsequent conveyor apparatus 9, a bottling machine is provided which is not shown in the drawings for simplicity's sake.

The subsequent pneumatically operated conveyor apparatus 9 fulfills different tasks: One the one hand, the main task is to convey the bottles 15b from the main conveyor apparatus 2 to the bottling apparatus; on the other hand, another task is to provide for a compensation zone in which probably occurring conveying differences between the main conveyor apparatus 2 and the bottling apparatus are compensated for. In order to correct for this differences of conveying speed, the positively operating conveyor located upstreams thereof, i.e. the handing over set-up 5 located at the input side, as well as the main conveyor apparatus 2 are synchronously corrected as far as their operating speed is concerned.

Instead of providing a separate subsequent pneumatically operated conveyor apparatus 9, it is also possible to design the airlock module as a subsequent conveyor and an intermediate conveyor, respectively, which operate with buffers. For this purpose, the airlock module must have a certain minimal length, for instance five meters. If the bottles 15b which are present in the airlock module 8 along a distance of five meters are elastically deformed in the conveying direction, lets say by an amount of 10% each, it is sufficient to compensate for probably occurring conveying differences between the main conveyor 2 and the handing over set-up 5 located at the output side of the conveyor apparatus during a certain period of time. In fact, this can be done a long as correction and control, respectively, influences take effect which have to initiated as soon as such conveying differences are recognized.

Normally, if such differences in conveying are recognized, the positively operating conveyors located upstream, as seen in the conveying direction, namely the handing over set-up 5 located at the input side as well as the main conveyor 2, are synchronously corrected as far as their speed is concerned. If the airlock module 8 itself is designed as an intermediate conveyor, normally no subsequent conveying apparatus in the real sense must be provided, but the bottles 15b can be handed over directly from the airlock module 8 to the subsequent operation station, i.e. the bottling apparatus. However, if required, for instance if long distances have to be bridged, it may useful to provide for a subsequent conveying apparatus.

If the airlock module 8 shall serve as a subsequent conveyor and an intermediate conveyor, respectively, means are provided for detecting eventually occurring conveying differences. This means must be designed such that they can recognize a deformation of the hollow containers, e.g. bottles, in a direction transverse to the conveying direction. Such a recognition is realized preferably by the provision of suitable optical means. On the basis of the detected deformation of the hollow containers, the speed of the main container and/or of the handing over set-up located at the input side and/or of the handing over set-up located at the output side can be corrected.

Having described the invention, the following is claimed:

1. A conveyor assembly for the conveying of containers which are open at one end thereof, particularly for the conveying of bottles made of plastic material, comprising:

a main conveyor means adapted to continuously convey a row of containers located within said main conveyor means at a certain distance from each other;

a first handing over set-up means located at the input side of said main conveyor means;

a second handing over set-up means located at the output side of said main conveyor means;

said first and second handing over set-up means being adapted, respectively, for handing over said containers from an input conveyor apparatus to said main conveyor means and from said main conveyor means to a subsequent conveyor means;

said first handing over set-up means located at the input side of said main conveyor means comprising a first airlock means in which said containers are aligned by means of the influence of an air stream for being handed over to said main conveyor means; and said second handing over set-up means located at the output side of said main conveyor means comprising a second airlock means in which said containers are aligned by means of the influence of an air stream for being handed over to said subsequent conveyor means;

said first handing over set-up means located at the input side of said main conveyor means comprising pneumatically operated means for subjecting said containers to overpressure.

2. A conveyor assembly for the conveying of containers according to claim 1, in which said first handing over set-up means located at the input side of said conveyor means comprises a first airlock means, said first airlock means being located immediately in front of said main conveyor means, said first airlock means being provided with a plurality of air nozzles having a certain distance in horizontal as well as in vertical distance, said nozzles serving for supplying moved air towards hollow containers in a direction opposite to the direction of movement of said hollow containers and, thereby, provide a resistance against the movement of said hollow containers.

3. A conveyor assembly for the conveying of containers according to claim 1 in which said airlock means comprises a bottom member serving as a vertical support and guiding means for said hollow containers.

4. A conveyor assembly for the conveying of containers according to claim 1 in which said first handing over set-up means located at the input side of said conveyor means comprises a pneumatical means, including means for following said displaced hollow containers which are displaceable along a path essentially corresponding to the length of the path of motion of said hollow containers.

5. A conveyor assembly for the conveying of containers according to claim 4 in which means are provided for compensating possibly occurring differences in height of the particular hollow containers, said means comprising elastic, resilient or yielding means.

6. A conveyor assembly for the conveying of containers according to claim 2 in which said first handing over set-up means located at the input side of said conveyor means additionally comprises a conveyor apparatus which is located between said pneumatically operated means and said airlock means.

7. A conveyor assembly for the conveying of containers according to claim 1 in which said second handing over set-up means located at the output side of said conveyor means is provided with a second airlock means, said second airlock means being adapted to serving as a jam zone for said hollow containers, with the result that the hollow containers conveyed by said main conveyor with certain mutual distance are merged.

8. A conveyor assembly for the conveying of containers according to claim 3 in which said bottom member of said airlock module serves as a vertical support and guiding member for said hollow containers.

9. A conveyor assembly for the conveying of containers according to claim 7 in which said second airlock module has a length of several meters such that said hollow containers are elastically deformable as seen in a direction of conveying said hollow containers, with the result that 'eventually occurring conveying differences between the main conveying apparatus and a subsequent conveyor means are compensated.

10. A conveyor assembly for-the conveying of containers according to claim 9 in which means are provided for detecting probably occurring deformation of said hollow containers present in a direction transverse to the direction of displacement of said hollow containers, and in which means are provided to adjust the speed of said main conveyor and/or said first handing over set-up means located at the input side of conveyor means and/or said second handing over set-up means located at the output side of said conveyor means in dependence of the measured deformation of said hollow container.

* * * * *